Patented Aug. 21, 1923.

1,465,530

UNITED STATES PATENT OFFICE.

HERBERT WILSON SMITH, OF WASHINGTON, DISTRICT OF COLUMBIA.

BATH SALTS.

No Drawing.　　Application filed January 18, 1922.　Serial No. 530,166.

To all whom it may concern:

Be it known that I, HERBERT WILSON SMITH, a citizen of the United States, residing at Washington, in the District of Columbia, have invented new and useful Improvements in Bath Salts, of which the following is a specification.

This invention relates to a composition of matter for producing a medicated bath of particular value in the treatment of obesity.

The composition consists of the following ingredients combined in the proportions stated:

|  | Per cent. |
|---|---|
| Magnesium sulphate | 90 |
| Sodium bicarbonate | 2 |
| Sodium chloride | 5 |
| Canadian balsam | 2 |
| Oil of pine needles | 1 |

In the preparation of the composition, I first mix the pine oil with the sodium bicarbonate, and then add the Canadian balsam, in dry powdered form. The sodium bicarbonate completely absorbs the pine oil with which it is saponified and the resultant product is in a dry state so that the Canadian balsam may be readily mixed therewith. The mixture is now allowed to stand several hours, after which the magnesium sulphate and the sodium chloride are added to complete the composition.

In using the composition, it has been found that the best results are obtained by adding from two to four pounds thereof to the hot bathing water. The composition dissolves completely with the exception of a minute quantity of inert residual matter and a solution of the constituent ingredients of the composition is produced. The pine oil does not rise to the surface of the water, but remains, with the Canadian balsam mechanically suspended in minute particles or globules in the water, so that there is produced what may be termed an emulsion, the oily and resinous substances being rendered emulsive by the sodium bicarbonate. The pine oil operates to open the pores of the skin, and the magnesium sulphate has a diaphoretic action stimulating the action of the sweat glands so that a profuse flow of perspiration from the open pores ensues.

The sodium chloride is employed for the purpose of counteracting the tendency of the skin toward looseness which usually occurs from long continued bathing in hot water. Sodium potassium tartrate may be used as a substitute for the magnesium sulphate with good results, and sodium carbonate or sodium thiosulphate may be used as the emulsifying agent instead of sodium bicarbonate.

The Canadian balsam acts in substantially the same manner as the pine oil, but in a milder manner, and it also serves to render the pine oil more stable and less liable to evaporate. If desired any coniferous oils or extracts thereof having the general properties of Canadian balsam may be substituted therefor, and any pine oil having the general properties of oil of pine needles may be substituted therefor.

It has also been found that the composition affords great relief in cases of inflammatory rheumatism and ailments of a similar character. In using the composition for this purpose, a suitable quantity is placed in a bag and dampened with hot water, the bag being applied to the affected part, or the affected part may be bathed in a stronger application or the bath may be taken as heretofore described for relief of a general rheumatic condition. The composition may also be used in this way for softening the skin of the face to obtain a velvety clear complexion, and it has also been found very useful and efficacious in the treatment of acne and similar skin troubles.

I claim:

1. A new composition of matter consisting of a pine oil incorporated with sodium bicarbonate, with an addition of Canadian balsam in dry powdered form, magnesium sulphate and sodium chloride.

2. The method of preparing a bath salt, consisting in mixing a pine oil with an alkali to absorb and render said oil emulsifiable, adding Canadian balsam in dry powdered form to the resultant product and mixing the same therewith, and adding magnesium sulphate and sodium chloride to the mixture.

In testimony whereof I affix my signature.

HERBERT WILSON SMITH.